United States Patent [19]
Egan

[11] 4,085,040
[45] Apr. 18, 1978

[54] FRONT FEED STATIC SCREEN

[75] Inventor: John J. Egan, Dayton, Ohio

[73] Assignee: The Bauer Bros. Co., Springfield, Ohio

[21] Appl. No.: 729,253

[22] Filed: Oct. 4, 1976

[51] Int. Cl.² .................................................. B01K 29/42
[52] U.S. Cl. ................................... 209/244; 209/274; 210/456
[58] Field of Search .............. 210/456, 409, 459, 433; 209/240, 273, 274, 243, 244, 254

[56] References Cited

U.S. PATENT DOCUMENTS

| | | | |
|---|---|---|---|
| 2,572,869 | 10/1951 | Koonce et al. | 210/456 X |
| 3,259,244 | 7/1966 | Kaldo et al. | 210/456 X |
| 3,353,674 | 11/1967 | Leeman | 209/240 |
| 3,452,876 | 7/1969 | Ginaven | 210/409 |
| 3,794,164 | 2/1974 | Ginaven | 209/243 |

*Primary Examiner*—John Adee
*Attorney, Agent, or Firm*—Jerome P. Bloom

[57] ABSTRACT

A static screen separator compact in both a vertical and a horizontal sense, including an inclined screen structure and a facing feed or head box from which a liquid-solids mixture overflows onto the screen. The head box is located to the front or flow face of the screen and nests therewith, substantially within the vertical and horizontal limits thereof. The head box embodies means defining an overflow lip which guides the slurry form of the liquid-solids mixture onto the flow face of the screen structure, which lip is flexible as to its contour both in the sense of flow and in a sense transversely thereof. The arrangement assures a smooth transition of the slurry from the head box to the screen flow surface irrespective of the nature or character of the contained solids. The overflow lip is reversely bent at the discharge end thereof which is resiliently biased to assume a pre-set position to contain the flow to the screen structure as it is caused thereby to move down the screen flow face in a uniform sheet-like flow.

10 Claims, 6 Drawing Figures

U.S. Patent April 18, 1978 Sheet 1 of 2 4,085,040
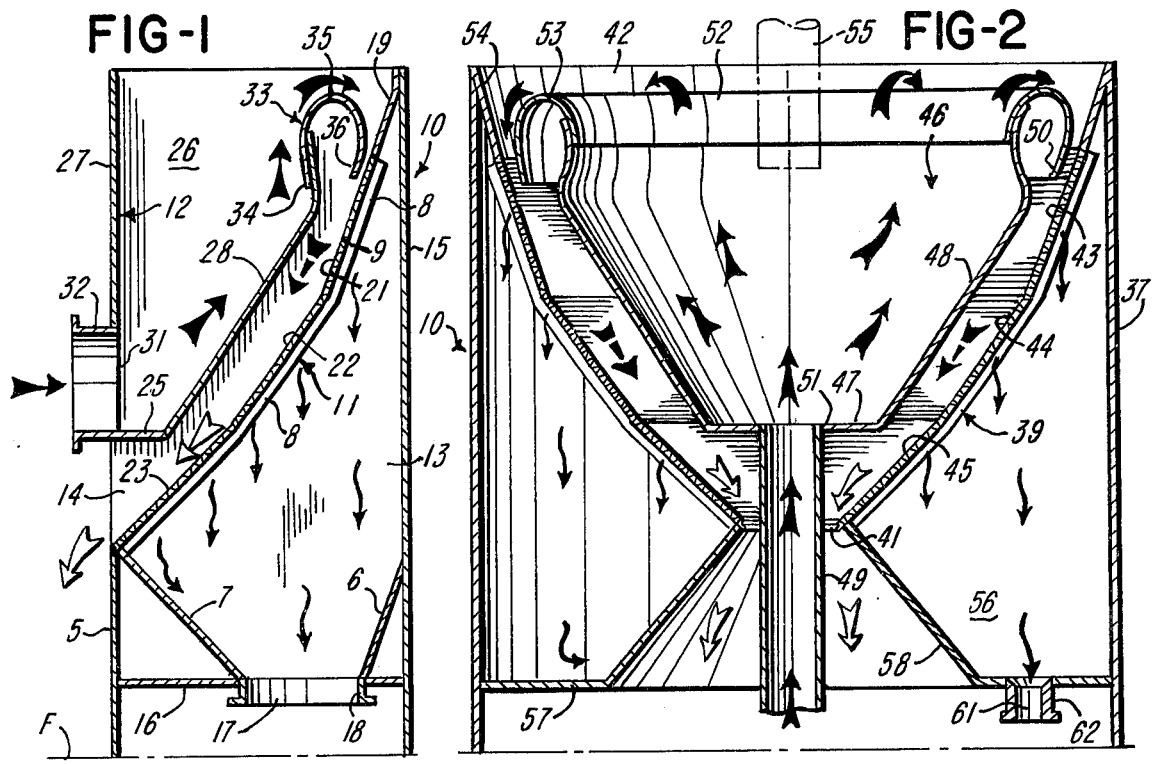
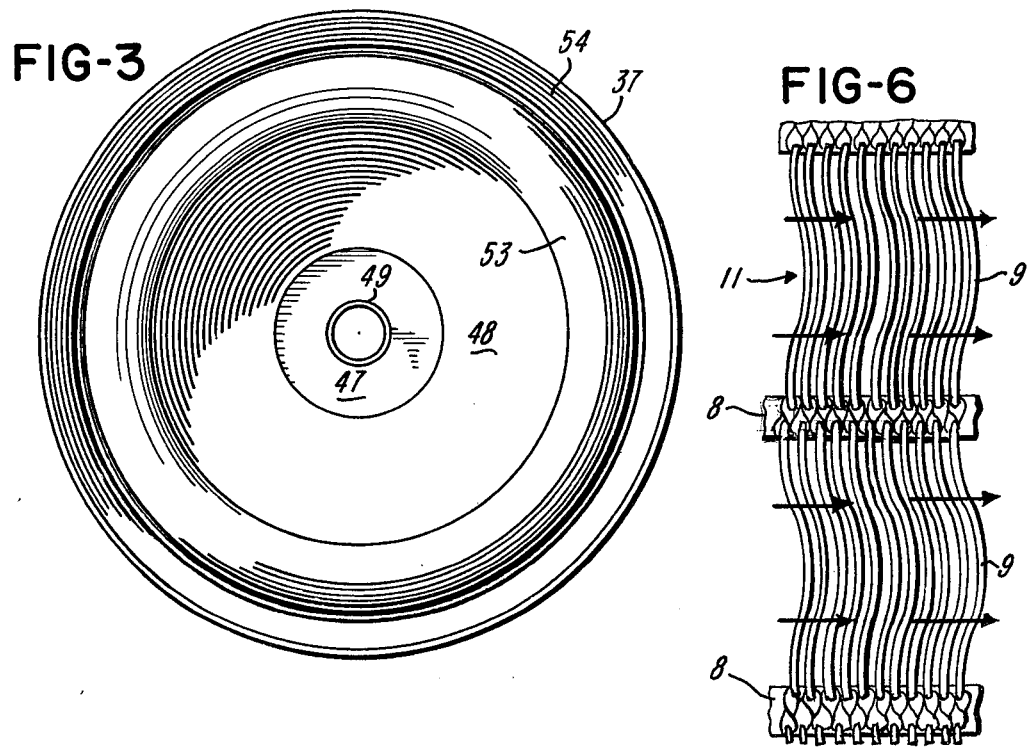

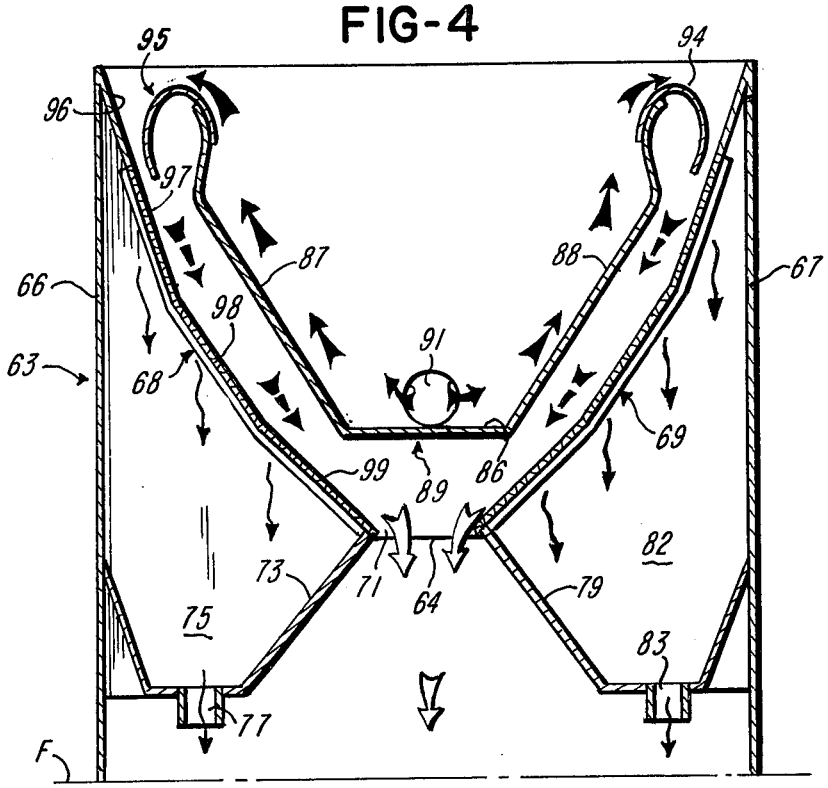
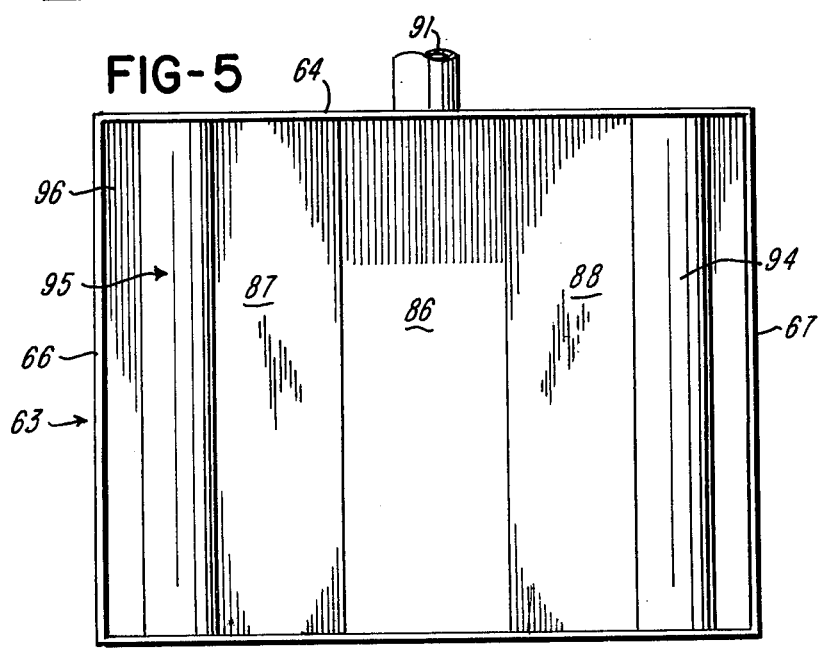

FRONT FEED STATIC SCREEN

BACKGROUND OF THE INVENTION

This invention relates to static screen separators and particularly to improvements in such apparatus effecting space savings and increased operating efficiency.

In the prior art, an inclined screen is supplied with a liquid-solids slurry either in a direct, full flow discharge upon the screen or in an overflow from an adjacent head box. An example of the former may be found in the U.S. Pat. No. 3,353,674, to Leeman dated Nov. 21, 1967. Separators of the Leeman type have certain disadvantages, particularly in the turbulence produced on the screen surface. Leeman provides a flexible movable wall to control flow onto the screen surface but, as will be obvious, the movable wall functions primarily as a flow deflector, being positioned immediately in the path of discharge upon the screen.

An example of a head box construction is found in U.S. Pat. No. 3,452,876, to Ginaven, dated July 1, 1969. The device disclosed in the Ginaven patent has enjoyed and continues to enjoy great commercial success in a number of material processing arts. It locates a head box to the rear of the upper end of an inclining screen, the head box being continuously supplied with a pulp or like slurry the components of which are to be separated and/or classified. Rising slurry in the head box overflows a weir and in sheet-like form moves smoothly down the upper screen surface. Liquid and fine solids pass through screen apertures and are appropriately collected and carried off. Coarse solids descend in a rolling, sliding action along the screen surface and discharge over a lower end thereof. The Ginaven device while eminently successful, as noted, does have certain limitations resulting from the rear location of its head box. Floor space required for a unitary assembly comprising a screen unit and a head box is greater than would be required for a screen unit alone. Also, increases in flow rate, productive of higher flow velocities, may not be fully contained and so lead to lowered separation efficiency.

The U.S. Pat. No. 3,833,123, to Walker, dated Sept. 3, 1974, shows a screen separator with a differently positioned head box. In this instance, the head box is mounted above the screen structure and over the frame enclosure for the screen unit. Serious construction as well as space problems of a different kind result with this arrangement. Also, in this case the overflowing slurry reaches the screen surface with an impact that causes turbulence and reduces separating efficiency.

Other prior art patents evidence various head box arrangements, the most pertinent of which are U.S. Pat. Nos. 3,363,769 and 3,794,164. U.S. Design Pat. Nos. 226,398 and 229,055 are similarly pertinent. However, none of these patents anticipate the specific improvements of construction or embody the advantages of the present invention.

SUMMARY OF THE INVENTION

The present invention has in view a generally new dewatering, separating and/or classifying device in which flow onto the flow face of a screen unit is directed from a head box positioned in a facing nested relation to the flow face. Not only does the positioning of the head box result in a highly compact and space saving arrangement but the head box in this case is provided with means defining an overflow weir located and formed to effect a smooth, non-turbulent transitional flow of a slurry from the head box to the screen flow face, which serves a separating and/or classifying function as the slurry discharged from the head box is caused to move down the face thereof in a relatively uniform sheet-like flow. The weir construction of the invention provides a side portion of the head box with a flexible and resilient lip formed by sheet material capable of adapting its total contour to varying flow demands. As arranged, the flexible resilient lip of the weir provides an initially flexible underlying surface for the overflow from the head box followed by a discharge end thereof which is reversely curved to overlie the upper end of the facing screen structure. The inherent resilience of the lip structure provides that the discharge end thereof biases to a pre-set position relative to the flow face of the adjacent screen structure in a manner to fully contain the flow discharging from the head box to the screen flow surface and to bias the discharging flow to move down the flow surface in a uniform sheet-like configuration under high volume flow conditions. The capability of the discharge end of the lip to contour in both the direction of flow and in a sense transversely thereof enables it to adapt to the presence of unusually large solids in the flow while maintaining the flow to the separating surface of the screen structure.

The invention thus provides plural features, one enabling a simple static screen unit highly effective in operation which is capable of reducing normal floor space requirements, as compared to a device such as shown in the Ginaven U.S. Pat. Nos. 3,452,876, by about 40%. A second of the features is provided by having the discharge lip of the weir portion of the head box serving both as a flexible underlying support for overflowing slurry which readily adapts to the volume and velocity thereof and as a device for overlying and biasing against the screen structure to which the slurry is laterally discharged in a manner to insure a positive biased containment thereof, whereby to cause the slurry to move down the flow surface of the screen structure in a relatively uniform adherent sheet-like flow. The arrangement is particularly advantageous where there is non-uniformity in flow rate and high volume flow with high flow velocity.

The nesting concept provided in structural embodiments of the invention enables, moreover, that the head box per se contains and limits incidental spray or deflection from flow moving down the separating flow surface of the screen structure. This lends obvious advantages in reference to minimizing incidental maintenance requirements and results in preservation of that structure and/or equipment adjacent to which the screen must be positioned in use.

It is accordingly a primary object of the invention to provide a space saving static screen separator which is economical to fabricate, more efficient and satisfactory in use, adaptable to a wide variety of applications and unlikely to malfunction.

Another object of the invention is to provide a static screen separator the screen flow surface of which nests a head box from which it receives a laterally directed overflow of slurry in a manner and by means which insures a smoother and more controlled delivery to the screen flow surface of a slurry the solids content of which must be separated and/or classified.

A further object of the invention is to provide a front fed screen separator capable of accommodating changing rates and volume of flow without loss of separating efficiency.

An additional object of the invention is to provide a static type screen separator wherein screen structure embodying a downwardly inclined flow surface adapted to separate liquid from a flowing slurry nests in facing relation thereto a head box one side wall portion of which provides for overflow of a slurry by way of a resilient lip which provides both for a support of the overflow and a bias thereof to the flow surface of the screen structure, as the slurry moves from the lip to and down the screen flow surface.

Another object of the invention is to provide for the front feeding of static screen separators by placing a head box in substantially nested relation to their flow surface and feeding slurry from the head box to the flow surface by means serving a supporting and biasing function adapting readily to the nature and the velocity of flow and contouring to localized irregularities in flow while preserving the sheet-like form thereof, whereby to cause the delivered slurry to move down the flow surface of the screen structure in a uniform sheet-like flow and in a channel limited at least in part by a facing wall of the head box.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings wherein are shown several but obviously not necessarily the only forms of embodiment of the invention, FIG. 1 is a partly diagrammatic view, in vertical section, of a static screen separator in accordance with a first illustrated embodiment of the invention;

FIG. 2 is a view like FIG. 1, showing a second illustrated embodiment of the invention;

FIG. 3 is a top plan view of the embodiment of FIG. 2;

FIG. 4 is a view like FIGS. 1 and 2, showing a third illustrated embodiment of the invention;

FIG. 5 is a top view of the embodiment of FIG. 4; and

FIG. 6 is a fragment, in plan view, of the preferred screen structure which is utilized in each of the herein described embodiments of the invention.

Like parts are indicated by similar characters of reference throughout the several views.

The static screen separator shown in FIG. 1 of the drawings includes a structure defining a housing 10 the bottom or base legs of which seat on a supporting floor surface F. The housing 10 contains and supports a screen structure 11, a head box 12 and, in underlying relation to the screen structure, means defining therewith an interior collection chamber 13. In the illustrated instance the housing includes a pair of laterally spaced apart side walls 14 (one shown), a back wall 15 interconnecting what may be regarded as rear vertical edges of the side walls 14, and a bottom wall 16 in a touching interconnected relation to the walls 14 and 15. The top of the housing may be closed but in the example shown it is open. The bottom wall 16 includes an aperture 17 serving as a discharge opening from the chamber 13. At the undersurface of the bottom wall 16 the opening 17 is bounded by an adapter 18 to which may be attached suitable conduit means for carrying effluent from the chamber 13.

The screen structure 11 can be comprised of a unitary, flat, apertured plate-like member having an inclined position within the housing 10 but in the preferred embodiment illustrated it is comprised of a planar screen structure bent to provide an operating flow surface comprised of three planar apertured segments 21, 22 and 23, the segment 21 of which has an upward co-planar extension 19 which is unapertured. The segments 21, 22 and 23 of the flow surface of the screen structure are each inclined and each is inclined relative the other. The section 21 is inclined to form an angle with a horizontal which is greater than that which the section 22 forms with a horizontal and the section 22, in turn, forms a greater angle with a horizontal than that formed by the section 23. In most preferred embodiments the differential of the inclination of relatively adjacent of said planar segments of the flow surface of the screen structure is held to the neighborhood of 10°.

The upper end of the screen structure 11 which includes the unapertured flow surface portion 19 is suitably disposed to rest against the back wall 15 at a location immediately adjacent its upper extremity. The lower end of the screen structure 11 is arranged to occupy a position approximately coincident with vertical front edge portions of the side walls 14. Thus, a screen structure is disposed in a position to provide that its flow surface descends from the upper rear portion of the housing 10 to a lower front portion thereof, in spaced elevated relation to its base. The lateral dimension of the screen structure is so provided as to cause it to bridge the side walls 14. Of course, suitable means are provided on the side walls 14 to which the side edges of the screen structure may be secured. Also, suitable sealing means are applied to prevent passage of liquid and/or solids between the lateral edges of the screen structure and the side walls 14.

Thus, in vertical section the outline of the screen structure 11 corresponds substantially to that of the screen unit of the U.S. Pat. No. 3,452,876, reference to which is made for a detailed disclosure of the preferred construction to use for the screen which defines the segments 21, 22 and 23 of the screen flow face. In general, as in the U.S. Pat. No. 3,452,876, the apertured screen portions defining the segments 21, 22 and 23 of the screen flow face are formed by longitudinally spaced apart horizontally disposed bars or wires 9 interconnected on their under side by laterally spaced apart longitudinally extending bars 8. The bars or wires 9 may be straight but preferably they are wave line bars providing between adjacent and underlying longitudinally extending bars 8 a gentle smoothly arcuate displacement thereof from a straight line and in the sense of anticipated flow. Thus, the apex of each arcuately displaced portion of the transversely extending bars 9 projects in a sense downwardly of the screen flow surface (see FIG. 6).

Connected at the lower projected end of the screen structure 11, and in bridging relation to the side walls 14, is the upper edge of a downwardly and rearwardly inclining plate 7 the lowermost edge of which bounds a forward edge portion of the aperture 17 as it is connected to the bottom wall 16. The rearmost edge of the aperture 17 is bounded by a plate 6 which bridges the side walls 14 and extends upwardly and rearwardly to connect to the back wall 15 in a line which is spaced upwardly from and parallel to the bottom wall 16. Accordingly, as will be seen, chamber 13 is bounded on its sides by the side plates 14, to its rear by the back wall 15 and the plate 6, to its front by the inclined plate 7 and at the top by the screen structure 11. The form of the portion of the bottom wall 16 intermediate the plates 6 and 7 is such to insure that any effluent depositing thereon will drain to and through the aperture 17. As illustrated, a further plate segment 5 extending between the side walls 14 connecting at its upper edge to the lower end of the screen structure 11 and vertically therebelow to the forwardly projected end of the bottom wall 16 forms a lower portion of the front wall of the housing 10.

Positioned between the side walls 14 at the upper forward corner portion thereof are means defining a head box 12. In the case illustrated the side walls 14 define sides of the head box 12. A further side of the head box 12 is provided by a plate segment 27 in bridging relation to upper forwardly projected edge portions of the side walls 14 in the plane commonly occupied by the plate segment 5. The bottom wall of the head box is provided by a plate segment 25 which has a relatively short length, the forwardmost edge of which joins to the lower end of the plate 27. The plate 25 extends in a plane generally parallel to that occupied by the bottom wall 16 and its rearmost or innermost edge positions over and in a spaced elevated relation to the segment 23 of the flow surface of the screen structure 11. The back wall of the head box 12 is provided by a plate 28 which bridges the side walls 14 and inclines upwardly from the innermost extremity of the plate 25 to which it is securely joined to position over and in spaced facing relation to an uppermost portion of the segment 23, the segment 22 and the lowermost portion of the segment 21 of the screen flow surface. The rear and uppermost end of the plate 28 is bent to approach a parallel relation to the plate 27 and its projected extremity is positioned to terminate in vertically spaced relation to and below the upper edges of the side walls 14. The upper extremity of the plate 28 has secured thereto one end of a segment of sheet material which forms thereon an overflow lip 33. This material which forms the overflow lip should preferably be made of stainless steel or its equivalent and of a gauge that it is capable of flexing and contouring, under applied load, in both a longitudinal and a transverse sense. As may be seen in FIG. 1 of the drawings, the lip element 33 is bent and initially set in an arcuate form to extend and curve upwardly from the upper end of the plate 28 and then curve downwardly in the direction of the section 19 of the flow surface defined on the screen structure 11, in a form to reach at its upper or apex portion a level spaced below both the upper end of the screen structure and upper edges of the side walls 14. The projected extremity of the lip element 33 is reversely bent to overlie the lower end of the segment 19 and the upper end of the segment 21 of the flow surface of the screen structure 11. The resiliency of the lip element 33 is such that the lower reversely bent portion 36 thereof is provided with a spring bias in the direction of the screen structure which influences it to seek to maintain its initially pre-set position.

As diagrammatically shown, at the lower end thereof the plate 27, forming part of the front wall of the housing and a side wall of the head box 12, includes therein an opening 31 rimmed by an adapter 32 for coupling a conduit connecting to a supply of slurry which may be delivered to the head box 12.

As may be seen, viewing FIG. 1 of the drawings, slurry may be delivered to and through the inlet 31 of the head box 12 to rise within the head box until it overflows the weir construction provided by the back wall 28 and the interconnected resilient lip element 33 which is in facing adjacent relation to the flow surface of the screen structure 11. As slurry overflows the weir construction, the load thereof will be resiliently supported and accommodated by the initial portion 35 of the lip element 33 and smoothly and laterally directed thereby toward the upper portion of the facing screen flow surface which is unapertured. It will then be directed downwardly over the projected reversely curved resiliently biased lip extremity 36. As will be obvious, the lip portion 35 will readily accommodate changes in volume and velocity of the overflowing slurry. By the same token, irrespective of the volume and velocity of flow, the slurry will be gently led to and between the screen flow surface and the flexed biased lip extremity 36. The inherent bias on the lip urging it to its pre-set position and its spring effect insures that irrespective of the volume of slurry handled or its speed of flow that the same will be caused to assume a sheet-like form as it moves to and down the screen flow surface. The fact that the projected extremity 36 of the lip element 33 is capable of flexing in a transverse sense means that if there are any unusual solids in the slurry flow that in the localized area thereof the lip element will contour to permit the same to pass while the remainder of the lip otherwise maintains the smooth sheet-like course of the slurry and its adherent relation to the elements which define the screen flow surface. Not only will the benefits of the particular screen structure utilized in forming the preferred flow surface for the slurry, as disclosed in the aforementioned U.S. Pat. No. 3,452,876, be preserved but their efficiency will be optimalized due to the front feed arrangement and the particular nature and function of the lip element 33. Under all conditions there will be a maximal adherence of the liquid content of the slurry in close moving relation to the screen flow surface, even under high volume and high velocity movement of the slurry, whereby to insure maximum separation of the liquid content. As mentioned previously, the contained facing relation of the head box insures, moreover, a containment of the flow which prevents inadvertent splashing and spraying from leaving the screen flow surface and creating maintenance problems in adjacent areas and in respect to adjacent equipment. This is totally apart from the extremely compact and inexpensive construction afforded by the present invention.

It will of course be self-evident that turbulence in the flow is naturally inhibited by the construction provided. Further note is taken that the screen separator of the invention which embodies a head box within the bounds thereof has no operative moving parts with the exception of that induced in the lip member 33 forming part of the weir construction afforded in connection with the head box 12.

Viewing FIG. 1, it is further seen that the discharge of the solids resulting in the separating or classifying process utilizing the screen structure 11 is by way of an expanded opening at the front wall of the housing 10, immediately below the plate 25 defining the bottom wall of the head box. It will be obvious that separated liquid which reaches the chamber 13 will be simply and readily directed therefrom by way of the discharge opening 17.

Thus the invention construction achieves all the improvements and benefits first mentioned including the avoidance of skipping, jumping and turbulence which occurs in use of prior art apparatus having similar application.

The features of the invention as exhibited in FIG. 1 may be similarly included in a static screen separator which has a circular or tubular construction. Such an embodiment of the invention is illustrated in FIGS. 2 and 3 of the drawings. As seen in FIG. 2, the peripheral outer wall 37 of the housing there illustrated is tubular in construction and has a vertical orientation. It includes dependent leg portions 38 which position the housing in spaced elevated relation to the floor F on which it is based. A screen structure 39 fixed in a contained nested relation to the upper end of the wall 37 is structured like the screen structure 11 but in this case it is continued laterally so as to provide it with a bowl-like configuration the bottom of which is formed with a central opening 41. Accordingly, the inner surface of the bowl-like screen structure 39 has a flow surface which is downwardly convergent to a discharge opening 41. The portions of the flow surface which respectively compare to the sections 19, 21, 22 and 23 of the screen structure 11 are respectively defined by the numerals 54, 43, 44 and 45. It is preferred in this case that there is a difference in the screen structure to the extent the bars or wires 9 will be straight rather than have the wave line form shown in FIG. 6.

Nested within and in concentric spaced relation to the screen structure 39 is a head box 46 which also has a bowl-like configuration. However, as illustrated, the head box configuration might more precisely be described as having an inverted frusto-conical shape, defined by its side wall 48 and its bottom wall 47, the latter of which has a central inlet opening 51 in which is connected the discharge end of a delivery conduit 49 for the slurry to be separated on and by the screen structure 39. In the embodiment illustrated in FIG. 2 the conduit 49 extends to and through the outlet opening 41, in centered relation thereto whereby to provide that the discharge opening in the bottom of the bowl-like screen structure 39 has an annular configuration.

Attention is directed to the fact that FIG. 2 alternately illustrates that slurry may be fed to the head box 46 by way of a pipe-like conduit 55 the discharge end of which positions centrally of the opening to the top of the head box. In case the delivery is by way of the pipe 55, it will be obvious that the bottom 47 of the head box will be sealed.

The wall 48 which peripherally bounds the chamber defined by the head box 46 will, as shown, be in relatively concentric nested relation to the flow surface of the screen structure 39 and have the upper end thereof bent to assume a generally vertically inclined position, giving the upper end of the wall 48 a slightly convergent form in an upward sense. Attached to the upper projected extremity of the wall 48 of the head box, which is circular in configuration, is a lip member 52 constructed like the lip member 33 and of similar material, the only difference being that the member 52 has a circular configuration. Thus, the member 52 which is flexible and resilient extends to assume an arcuate configuration, initially upwardly of the upper edge of the wall 48 and then over and down in a reversely bent configuration to have its projected bent extremity 50 inherently biased to normally seek its pre-set position adjacent the screen flow surface in the area of its upper portion as described with reference to the embodiment shown in FIG. 1 of the drawings. As in the case of the embodiment of FIG. 1, upon delivery of slurry to the head box 46 it will be caused to overflow the resilient flexible arcuate upper surface portion 53 of the weir member 52 and follow the contour thereof as it flexes and accommodates the load applied thereby to move to and against the screen flow surface, initially against the imperforate portion 54 thereof and downwardly therefrom. Even under high volume, high velocity conditions the slurry is biased by the projected reversely bent extremity of the lip to maintain a sheet-like form and adherence to the screen flow surface. All the benefits and advantages of the invention accrue in this bowl-like arrangement of FIGS. 2 and 3 of the drawings wherein the head box is fully nested within and contained by the screen structure 39.

Under and peripheral to the screen structure 39 is an effluent chamber 56. The outer periphery of chamber 56 is encompassed by the wall structure 37 and its bottom is formed by an annular plate 57 joining the bottom of the wall structure 37 at its outer edge and the expanded lower extremity of a plate 58. The configuration of plate 58 is like that of a section of a cone and its truncated upper end is joined to the lower end of the bowl-like screen structure 39, in rimming relation to the outlet opening 41. A relatively depressed portion of the plate 57 has an aperture 61 rimmed by an adapter forming a connector for an effluent discharge line (not shown).

The embodiment of FIGS. 2 and 3 gives maximum separation and classification for the space utilized. The movement of the slurry and the function of the head box and the resilient flexible lip member in connection therewith are as previously described. The arrangement is such to provide a highly effective extraction of liquid and a fast segregated discharge of the solids from which liquids have been separated, by way of the outlet opening 41.

FIGS. 4 and 5 of the drawings show a modification of the static screen separator-head box unit of the invention to provide a housing 63 which is rectangular in peripheral configuration rather than circular. It will be obvious that its net effect is the placement of two screen structures 11 such as shown in FIG. 1, here represented by the numerals 68 and 69, with their flow surfaces in facing spaced relation to define therebetween a downwardly convergent channel having a limited outlet opening 71. In this case, the respective side edges of the screen structures, as well as the sides of the respective effluent discharge chambers 75 and 82 which they overlie, are bridged by plates 64 which form side walls of the housing 63. The other side walls of the housing are provided by plates 66 and 67 which are remotely disposed to form back walls for the respective chambers 75 and 82.

The plates 64 are transversely bridged, intermediate the facing flow surfaces of the screen structures 68 and 69, by a single plate which connects thereto and forms therewith a head box 89. This single plate is bent to provide the head box with a relatively short bottom wall 86 from the lateral edges of which extend upwardly divergent side wall portions 87 and 88. The upper extremities of the side wall portions 87 and 88 of the head box are bent to an approximately vertical position and each has in connection therewith a flexible resilient lip member similar in construction and function to the lip members in the previously described embodiments of the invention. Here the lip members are respectively defined by the numerals 95 and 94. As seen, the head box 89 is centered and nested between the opposing faces of the screen structures 68 and 69, in spaced relation to their flow surfaces. The side wall portions 87 and 88 of the head box together with the lip elements 94 and 95, which lie below and in spaced relation to the upper extremity of the housing 63, are in generally following facing relation to the screen flow surfaces and define with them, respectively, a limited flow channel affording advantages which have been previously mentioned. In this case the head box 89 has an inlet opening 91 formed in one side wall thereof which is provided by a portion of the plate 64.

As will be seen from FIG. 4, plates 73 and 79 which are in bridging relation to the plates 64 respectively connect to the lower ends of the screen structures 68 and 69 to extend downwardly therefrom in diverging relation and to have their lower divergent extremities in connection with the relatively adjacent spaced edges of bottom wall portions of the housing 63. The plates 73 and 79 respectively provide front wall portions of the respective effluent chambers 75 and 82 each of which has an opening therefrom at the bottom which is defined by a part of the bottom wall portion of the housing 63.

In utilizing the embodiment of FIGS. 4 and 5, slurry delivered to the head box 89 will simultaneously overflow the respective lip members 94 and 95. As the slurry moves across and down, and is supported by the arcuate extent of the underlying lip member, the lip member not only serves to gently smooth and guide the slurry to the facing flow surface but, as previously indicated, the spring form thereof causes the reversely bent portion thereof to bias the slurry to the adjacent flow surface and insure an inherent sheet-like flow thereof down said flow surface.

As will be seen, each and every one of the embodiments herein described have well defined and obvious advantages not comprehended by the prior art. Moreover, each embodiment exhibits economy in space requirement as well as economy in structure and optimal efficiency is inherent in its use.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to the structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Apparatus for separating and/or classifying components of a mixture of liquids and solids forming a slurry including screen structure presenting a descending flow surface adapted to induce separation of liquid from solids as a slurry is moved thereacross, means defining a head box positioned forwardly of and in a facing relatively nesting relation to the flow surface of said screen structure, said head box being arranged to receive a slurry and to discharge said slurry therefrom by overflow, said head box including a weir-like overflow lip positioned in adjacent facing relation to the upper end of said descending flow surface and arranged to form therewith means defining a limiting passage for confining the discharging slurry to said descending flow surface and to firmly control the slurry in a manner to insure that it assumes a relatively uniform sheet-like form as it moves down said flow surface.

2. Apparatus as in claim 1 wherein said overflow lip is defined by an arcuately configured plate the outer free end of which is reversely bent and has a spring-like form whereby to firmly accommodate and adapt to different degrees and velocities of the slurry which overflows said lip.

3. Apparatus for separating and/or classifying components of a mixture of liquids and solids forming a slurry including screen structure presenting a descending flow surface adapted to induce separation of liquids from solids as a slurry is moved thereacross, means defining a head box positioned in a facing relatively nesting relation to the flow surface of said screen structure, said head box being arranged to receive a slurry and discharge said slurry therefrom by overflow, said head box including a weir-like overflow lip for the discharging slurry which is positioned in adjacent facing relation to the upper end of said descending flow surface to form therewith a limiting passage for confining the discharging slurry to said descending flow surface to firmly control the slurry in a manner to insure that it assumes a relatively uniform sheet-like form as it moves down said flow surface, said overflow lip being defined by an arcuately configured plate the outer free end of which is reversely bent and has a spring-like form whereby to firmly accommodate and adapt to different degrees and velocities of the slurry which overflows said lip and means defining a housing mounting said screen structure within the boundary thereof and said screen structure being in peripherally encompassing relation to said head box which nests concentrically therewith and in spaced relation to the flow surface of said screen structure.

4. Apparatus as in claim 1 wherein said screen structure and said head box are commonly embodied in a single housing structure.

5. Apparatus for separating and/or classifying components of a mixture of liquids and solids forming a slurry including screen structure presenting a descending flow surface adapted to induce separation of liquid from solids as a slurry is moved thereacross, means defining a head box positioned in a facing relatively nesting relation to the flow surface of said screen structure, said head box being arranged to receive a slurry and to discharge said slurry therefrom by overflow, said head box including a weir-like overflow lip for the discharging slurry which is positioned in adjacent facing relation to the upper end of said descending flow surface to form therewith a limiting passage for confining the discharging slurry to said descending flow surface to firmly control the slurry in a manner to insure that it assumes a relatively uniform sheet-like form as it moves down said flow surface, said screen structure and said head box being commonly embodied in a single housing structure and said housing structure mounting said screen structure to provide screen flow surfaces disposed in facing relatively adjacent spaced relation which define between the lower ends thereof a common discharge opening for the portions of a slurry which discharge from their lower ends and the means defining said head box is nested between and in spaced relation to said facing flow surfaces and includes a plurality of resilient overflow lips for simultaneously delivering overflow slurry to each of the upper end portions of the relatively opposed flow surfaces of said facing screen structures.

6. Apparatus for separating and/or classifying components of a mixture of liquids and solids forming a slurry including screen structure presenting a descending flow surface adapted to induce separation of liquid from solids as a slurry is moved thereacross, means defining a head box positioned in a facing relatively nesting relation to the flow surface of said screen structure, said head box being arranged to receive a slurry and to discharge said slurry therefrom by overflow, said head box including a weir-like overflow lip for the discharging slurry which is positioned in adjacent facing relation to the upper end of said descending flow surface to form therewith a limiting passage for confining the discharging slurry to said descending flow surface to firmly control the slurry in a manner to insure that it assumes a relatively uniform sheet-like form as it moves down said flow surface, said head box being defined by means a wall portion of which is in facing adjacent relation to the flow surface of the adjacent screen structure to form therewith a channel through which the portion of the slurry which does not exit through said screen structure will pass as it moves from the upper to the lower end thereof.

7. Apparatus for separating and/or classifying components of a mixture of liquids and solids forming a slurry including screen structure presenting a descending flow surface adapted to induce separation of liquid from solids as a slurry is moved thereacross, means defining a head box positioned in a facing relatively nesting relation to the flow surface of said screen structure, said head box being arranged to receive a slurry and to discharge said slurry therefrom by overflow, said head box including a weir-like overflow lip for the discharging slurry which is positioned in adjacent facing relation to the upper end of said descending flow surface to form therewith a limiting passage for confining the discharging slurry to said descending flow surface to firmly control the slurry in a manner to insure that it assumes a relatively uniform sheet-like form as it moves down said flow surface, said overflow lip being formed by a resilient flexible extension of means defining a wall portion of said head box, which extension has a load accommodating capability resiliently accommodating the movement thereacross of slurry overflowing from the head box to the adjacent flow surface of said screen structure and a projected extremity biased toward said flow surface to define an extended surface which bears against the slurry as it commences its movement on and down the flow surface to which it is directed.

8. Apparatus as in claim 1 characterized in that said lip lies below the upper extremity of said housing and is variable as to its spacing from the upper end of the housing in accordance with the load applied thereto by slurry which overflows said lip in movement thereof to the flow surface of the adjacent screen structure, which is immediately faced by said lip.

9. Apparatus for separating and/or classifying components of a mixture of liquids and solids forming a slurry including screen structure presenting a descending flow surface adapted to induce separation of liquid from solids as a slurry is moved thereacross, means defining a head box positioned in a facing relatively nesting relation to the flow surface of said screen structure, said head box being arranged to receive a slurry and to discharge said slurry therefrom by overflow, said head box including a weir-like overflow lip for the discharging slurry which is positioned in adjacent facing relation to the upper end of said descending flow surface to form therewith a limiting passage for confining the discharging slurry to said descending flow surface to firmly control the slurry in a manner to insure that it assumes a relatively uniform sheet-like form as it moves down said flow surface, said screen structure having a bowl-like configuration and including an opening at its bottom which defines the lower end of said screen structure, said opening providing for discharge of that portion of the slurry which does not pass through said screen structure in the course of its movement from the upper to the lower end thereof and said head box being nested in said bowl-like screen structure in a generally concentric spaced relation thereto, the upper end of said head box being defined by said lip and being positioned below the upper limit of said screen structure.

10. Apparatus as in claim 1 wherein said head box and said screen structure are embodied in a housing comprised of side and front and back walls, said screen structure being arranged to bridge said side walls and to extend from adjacent the top of said back wall to adjacent the bottom of said front wall, bottom wall structure in connection with said housing connecting to said back and side walls and to said screen structure adjacent the end thereof extending to said front wall to form with said screen structure and said back and side walls an effluent receiving chamber, an upper section of said front wall defining a wall portion of said head box the opposite wall portion of which is positioned in adjacent spaced and facing relation to an upper portion of said screen structure to form therewith an extension of said limiting passageway the exit from which is by an opening in the front wall of said housing defined between said head box and the lowermost end of said screen structure.

* * * * *